United States Patent [19]

Lassiter, Jr.

[11] Patent Number: 4,482,115
[45] Date of Patent: Nov. 13, 1984

[54] FLIGHT CONTROL MIXING SYSTEM

[76] Inventor: John Lassiter, Jr., 4461 E. Pikes Peak Ave., Colorado Spring, Colo. 80916

[21] Appl. No.: 260,115

[22] Filed: May 4, 1981

[51] Int. Cl.$^3$ .............................................. B64C 13/00
[52] U.S. Cl. .................................. 244/220; 74/471 R; 244/225
[58] Field of Search ............... 244/75 R, 220, 221, 244/225, 230, 237, 90 R; 74/469, 471 R, 471 XY

[56] References Cited

U.S. PATENT DOCUMENTS

| | | | |
|---|---|---|---|
| 2,304,487 | 12/1942 | Stinson | 244/225 |
| 2,454,981 | 11/1948 | Vint, Jr. | 244/225 |
| 2,573,044 | 10/1951 | Morris | 244/225 |
| 2,580,841 | 1/1952 | Ross | 244/90 R |
| 2,685,422 | 8/1954 | Hammond et al. | 244/225 |
| 3,176,936 | 4/1965 | Howard et al. | 74/471 |

FOREIGN PATENT DOCUMENTS 11397 7/1909 France ............................... 244/225

*Primary Examiner*—Charles E. Frankfort
*Attorney, Agent, or Firm*—Walter G. Finch

[57] ABSTRACT

The invention is an improved flight control system for aircraft. The improved flight control system mixes or blends several flight control movements into a unified operation. The flight control mixing system of this invention combines the functions of standard ailerons (a roll and lateral control device) with standard flaps (a lift control device) on aircraft into a single control device, referred to herein as flaperons. The improved system can also be used on tailess or flying wing type aircraft to combine the functions of standard ailerons with the elevator functions (a nose up or down pitch control device) into a single control device, referred herein as elevons. The improved system is also applicative to V-tail type aircraft for controlling the elevators in a similar single control operation, herein referred to as ruddervators. The improved flight control mixing system consists of an improved linkage system comprising five major components: a swing arm mounting element affixed to the airframe; a swing arm element for control of concurrent parallel operation of flight control surfaces; a special bell crank-like element capable of two modes of transmission of flight control operations; a bell crank element for transmitting one of the modes of transmission to the special bell crank-like element; and a transfer component to transfer input from the bell crank element to the special bell crank-like element.

24 Claims, 6 Drawing Figures

FLIGHT CONTROL MIXING SYSTEM

BACKGROUND AND SUMMARY OF THE INVENTION

The invention relates to aircraft controls and particularly to aircraft flight controls. Specifically, the invention relates to a mixing or blending of several aircraft flight controls into a single combined means of the flight control operations.

In the prior art separate control means are provided from the point of input to the flight control means to be activated as the output. The present invention mixes or blends several of the control operations so that a single input device can be used for a plurality of flight control means to be activated. The details are described and discussed hereinafter.

Because of the mixing or blending of a plurality of flight control movements, the present single source input might be termed an ultrol aircraft flight control system.

The ultrol aircraft flight control system combines the functions of standard ailerons (a roll and lateral control device) with standard flaps (a lift control device) on aircraft into a single control device. This combination of the control devices may be referred to as flaperons.

The ultrol aircraft flight control system can also be used on tailess or flying wing type aircraft to combine the functions of standard ailerons with the elevator functions (a nose up or down pitch control device) into a single control device. This combination of the control devices may be referred to as elevons.

In a similar manner, the ultrol aircraft flight control system may also be applied to V-tail type aircraft for controlling the elevators at the rudder into a similar single control operation. This combination of control devices may be referred to a ruddervators.

The flight control mixing system is applicable to model aircraft and light aircraft as well as other types. The flight control mixing system may be arranged for operation manually or for mechanical operation, such as by a servo mechanism. In regard to the servo mechanism, such an arrangement on aircraft, such as model aircraft, can be by radio control.

The flight control mixing system basically comprises five major components. Those five major components are: a swing arm mounting element affixed to the airframe; a swing arm element for control of concurrent parallel operation of flight control surfaces; a special bell crank-like element, in a T-configuration, capable of two modes of transmission of flight control operations or movements; a bell crank element for transmitting one of the modes of transmission to the special bell crank-like element; and a transfer means of input from the bell crank element to the special bell crank-like element. A more detailed description and operational mode for each of these components is provided hereinafter.

It is, therefore, an object of the invention to provide a flight control mixing system which will mix or blend the operational movements of flight control means through the function of a single input control device.

It is another object of the invention to provide a flight control mixing system that combines the functions of standard ailerons (a roll and lateral control device) with standard flaps (a lift control device) on conventional aircraft into a single control means.

It is also an object of the invention to provide a flight control mixing system that combines the functions of standard ailerons with the elevator functions (a nose up or down pitch control device) on tailess or flying wing type aircraft into a single control means.

It is yet another object of the invention to provide a flight control mixing system that may be applied to V-tail type aircraft for controlling the elevators and the rudder into a single control operation.

It is still another object of the invention to provide a flight control mixing system that is also applicable to model aircraft control.

It is yet still another object of the invention to provide a flight control mixing system that may be operated manually or by mechanical means, such as servo mechanisms.

It is also another object of the invention to provide a flight control mixing system that can be operated by radio control means.

Further objects and advantages of the invention will become more apparent in the light of the following description of the preferred embodiments.

DESCRIPTION OF THE PREFERRED EMBODIMENTS

Figure 1:
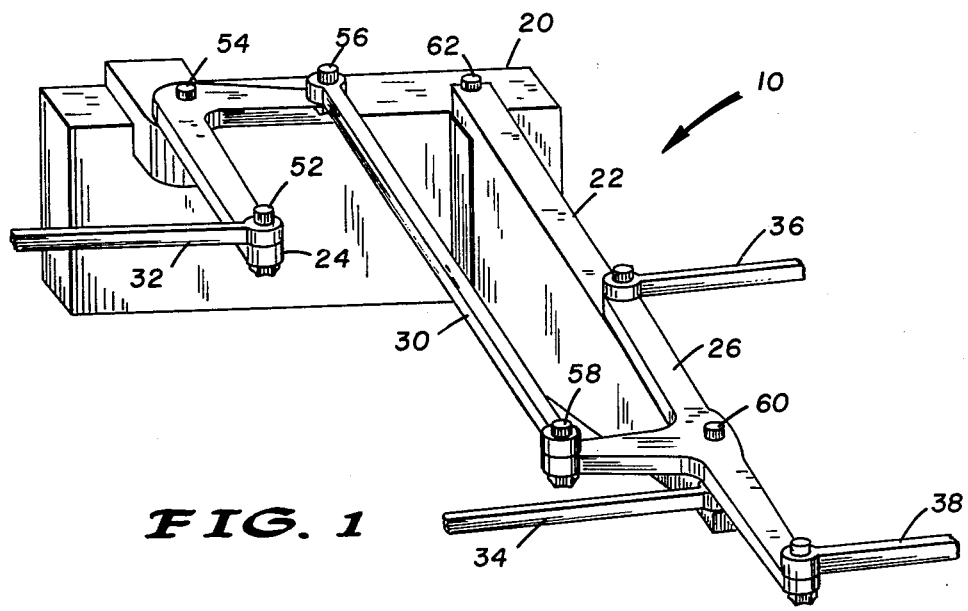
FIG. 1 is a pictorial view of a first embodiment of a flight control mixing system.

Referring to the drawings and particularly to FIG. 1, a first embodiment of a flight control mixing system is shown at 10. A second embodiment of a flight control mixing system is shown at 15 in FIG. 2.

Variations of the first embodiment of a flight control mixing system are shown at 10 in FIGS. 3, 4, 5, and 6.

Turning now to FIG. 1, the first embodiment of a flight control mixing system 10 consists of five major components. The five major components are: a swing arm mounting element 20 affixed to the airframe to anchor the system; a swing arm element 22 for control of concurrent parallel operation of flight control surfaces by longitudinal movement of control means; a special bell crank-like element 26 in a T-configuration capable of two modes of transmission of flight control operations or movements; a bell crank element 24 for transmitting one of the modes of transmission to the special bell crank-like element 26; and a force transfer means 30 of input from the bell crank element 24 to the special bell crank-like element 26.

Figure 2:
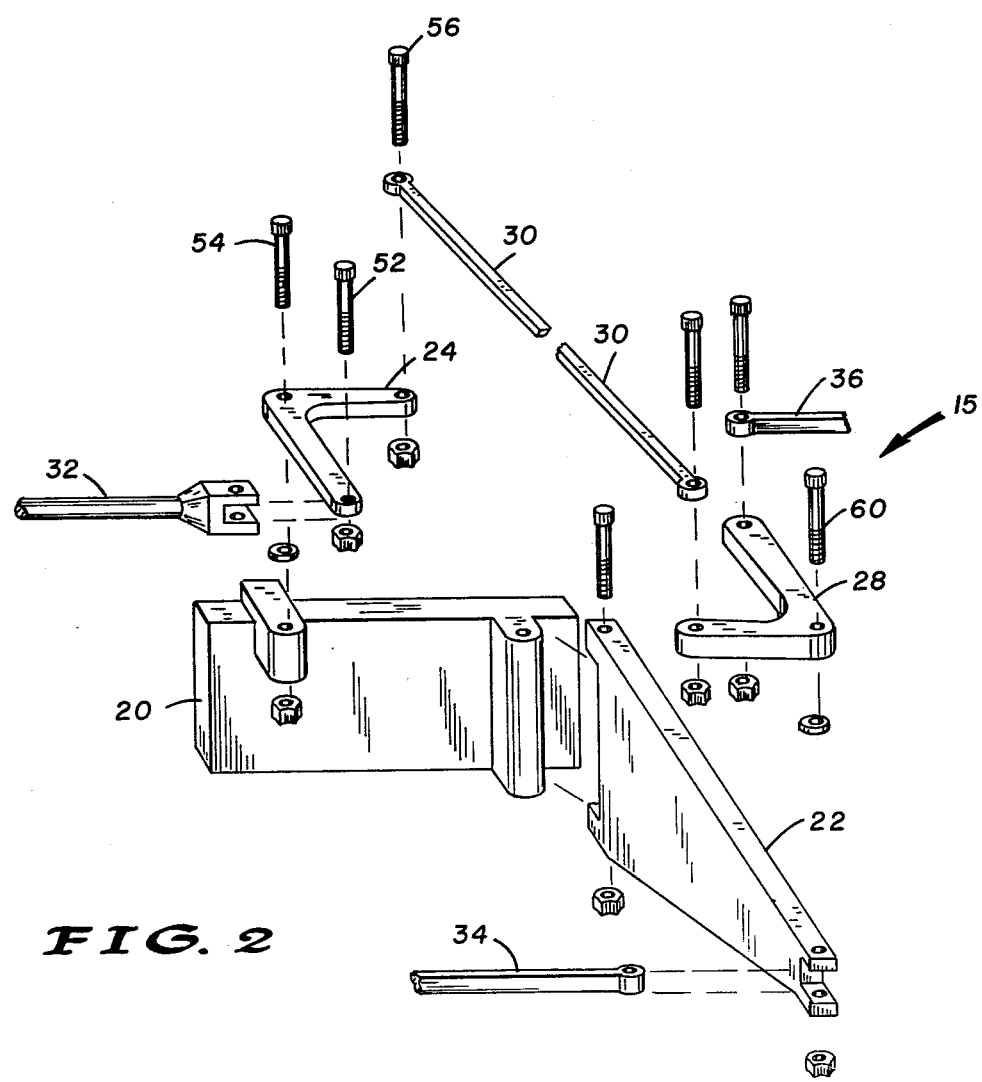
FIG. 2 is an exploded view of a second embodiment of a flight control mixing system.

The only difference between the first embodiment of a flight control mixing system 10 in FIG. 1 and the second embodiment of a flight control mixing system 15 in FIG. 2, is that the first embodiment is an arrangement for mounting more or less centrally in the airframe, while the second embodiment is an arrangement that provides a left and right mode. The left and right modes being arranged for separate mounting on the left and right sides of the airframe.

In the second embodiment, shown as an exploded pictorial view in FIG. 2, the right side mode is shown, all components are the same except that instead of the special bell crank-like element 26 in a T-configuration, the second embodiment has a bell crank element 28 for operation of flight control operations on the right side of the aircraft. The complete second embodiment requires a companion mirror image left side mode (not shown) for operation of flight control operations on the left side of the aircraft.

In the descriptions which follow, the presentations will be related to the first embodiment of a flight control mixing system 10. Essentially, the operations of the second embodiment are the same. The control rods that transmit input force to the second embodiment of the flight control mixing system 15 would be doubled, because of the left and right modes, however, these can be linked together into a single set of control rods at the cockpit force input position.

Previously it has been mentioned that there is a variation of the first embodiment of flight control mixing system 10, a similar variation could be made in the second embodiment of flight control mixing system 15. The variation in no way changes the operation of the systems, it is merely a variation in the manner in which the special bell crank-like element 26 (or the bell crank element 28) is mounted on the swing arm element 22. A detailed description is provided hereinafter.

Note in FIG. 1 for the first embodiment of a flight control mixing system 10 and in FIG. 2 for the second embodiment of a flight control mixing system 15, that the special bell crank-like element 26 and the bell crank element 28, respectively, are both mounted on the swing arm 22 and removably affixed in place by bolt or pin-type means 60. Note, too, that the bolt or pin-type means 60 also concurrently serves as the connecting or affixing means for removably affixing cockpit force input means or control rod means 34 to swing arm 22.

As to the variation in the mode of mounting the special bell crank-like element 26, or the bell crank element 28, on the swing arm 22, the variation can be seen in FIGS. 3, 4, 5, and 6. Note that the bolt or pin-type means 60 does not concurrently serve as the affixing means for the cockpit force input means 34 to the swing arm 22. The bolt or pin-type means 60, in the variation, makes the removably affixed mounting position at an inboard point spaced from the outboard end of the swing arm element 22. In this case a bolt or pin-type means 68 removably affixes the cockpit force input means 34 to the swing arm 22. This variation of mounting position does not change the operation of the present invention.

It is to be noted and understood that, although bolt means are illustrated in the drawings for the various connection previously described and for those that follow, these connections may be pin-type connections or other connecting means known in the art. Such variations of connecting or affixing means for the pivot or hinge-like connections are within the scope and intent of the invention.

Turning now to a description of the various operations of the first embodiment of flight control mixing system 10, it is to be understood that the operation of the second embodiment of the flight control mixing system 15 is substantially the same. In FIG. 1 it can be seen that: cockpit force input control means 32 is removably and pivotally affixed to bell crank element 24 by bolt or pin-type means 52; bell crank element 24 is removably and pivotally affixed to swing arm mounting element 20 by bolt or pin-type means 54; force transfer means 30 is removably and pivotally affixed to bell crank element 24 by bolt or pin-type means 56; force transfer means 30 is removably and pivotally affixed to special bell crank-like element 26 by bolt or pin-type means 58 (this also applies to the comparable connection to bell crank 28 in FIG. 2); swing arm 22 is removably and pivotally affixed to swing arm mounting means 20 by bolt or pin-type means 62; and special bell crank-like 26 is removably and pivotally affixed to swing arm 22 by bolt or pin-type means 60 as hereinbefore described (this also applies to bell crank element 28 in FIG. 2). As also noted hereinbefore, bolt or pin-type means 60 also concurrently removably and pivotally affixes cockpit force input control means 34 to swing arm 22 as one variation of assembly or by bolt or pin-type means 68 as another variation of assembly as shown in FIGS. 3, 4, 5, and 6.

As noted hereinbefore, these removably and pivotally affixed elements by the specified bolt or pin-type means are substantially the same for both the first embodiment of a flight control mixing system 10 and the second embodiment of a flight control mixing system 15.

Describing now the operation of the present invention, refer first to FIG. 1. When the swing arm element 22 is held stationary at a right angle to swing arm mounting element 20 by the cockpit force input control means 34, the movement of cockpit force input control means 32, in a push-pull mode, will transmit the movement via bell crank 24 and force transfer means 30 to the special bell crank-like element 26.

As can be seen in FIGS. 1 and 2, the bell crank elements 24 and 28 are pivotally affixed at the "elbow" of the bell crank configuration. Likewise the T-configured special bell crank-like element 26 is pivotally affixed at the juncture of the cross member and the vertical leg of the "T".

Figure 3:
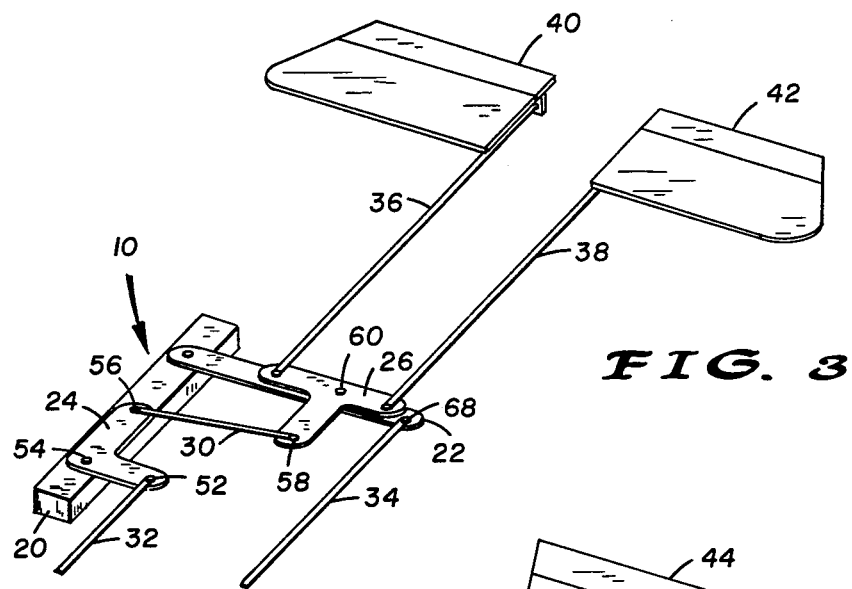
FIG. 3 is a pictorial view of a variation of a first embodiment of a flight control mixing system applied to aileron and flap control of conventional winged aircraft.
Figure 4:
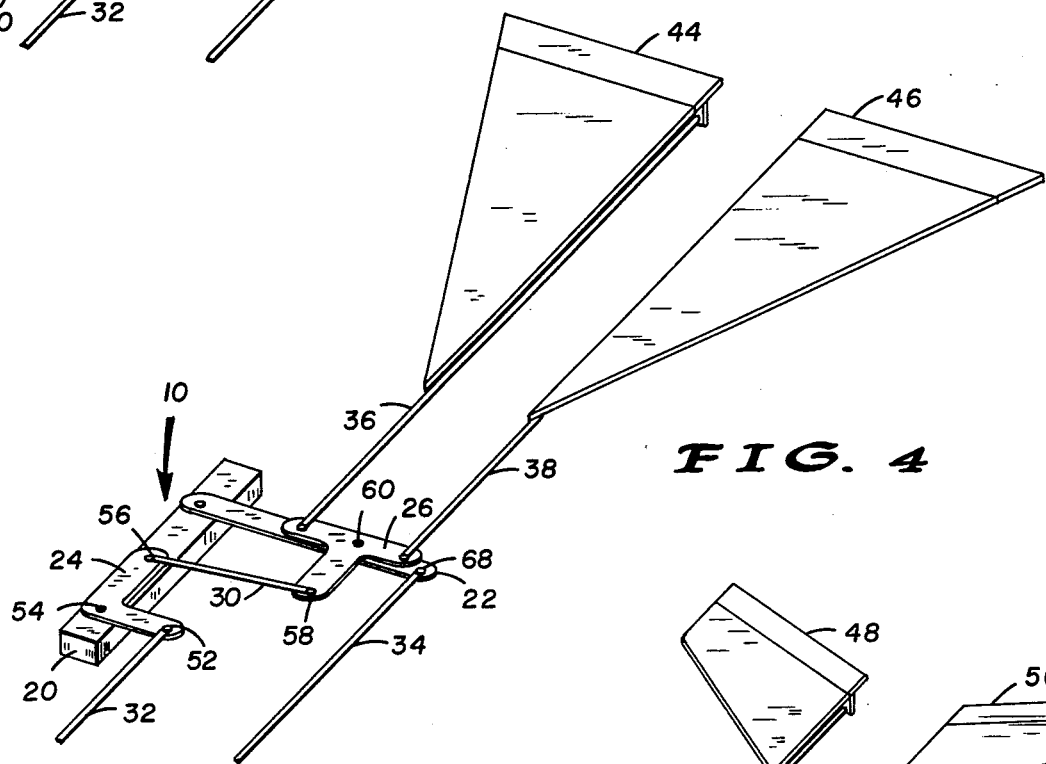
FIG. 4 is a pictorial view of a variation of a first embodiment of a flight control mixing system applied to aileron and elevator control of tailess or canard type aircraft.
Figure 5:
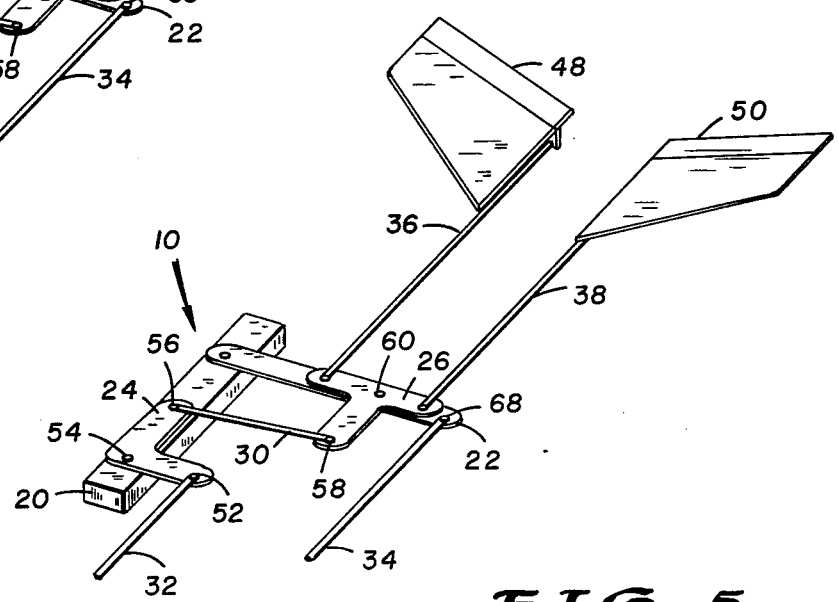
FIG. 5 is a pictorial view of a variation of a first embodiment of a flight control mixing system applied to elevator and rudder control of V-tail aircraft.

In this latter case the T-configured special bell crank-like element 26 will pivot about the bolt or pin-type means 60 and give opposite direction movements to force output transmission means 36 and 38 respectively. That is when force output transmission means 36 is moved in a pull direction, force output transmission means 38 is moved in a push direction. Likewise, when force output transmission means 38 is moved in a pull direction, force output transmission means 36 is moved in a push direction. The movement of force output transmission means 36 and 38 is transferred to the flight control surfaces as shown in FIGS. 3, 4, and 5 and as hereinafter described.

No detailed description will be given for the second embodiment of a flight control mixing system 15, but it is to be noted that all of the operation and movements are substantially the same. The difference being that in the second embodiment left and right mirror image assemblies operate to produce the same movements.

Figure 6:
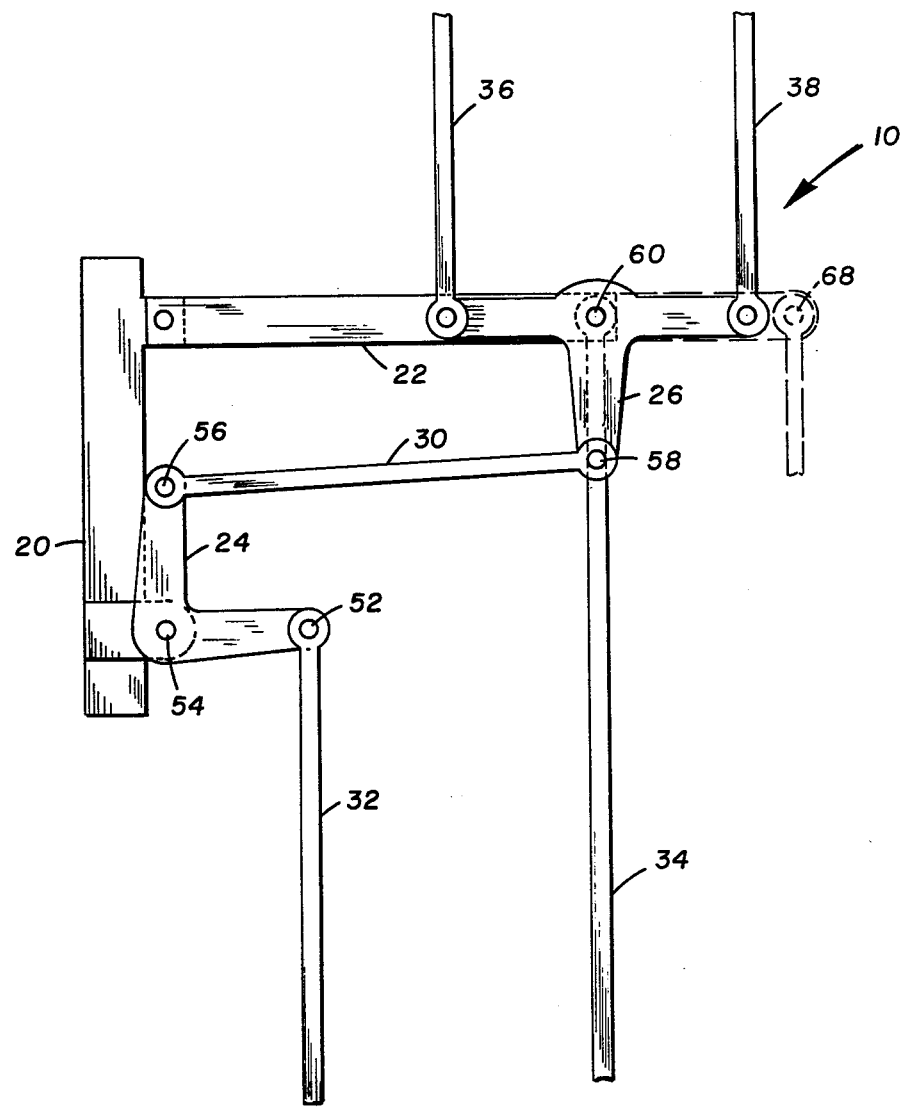
FIG. 6 is a plan view of a variation of the FIG. 1 arrangement for control of the systems of FIGS. 3, 4, and 5.
Figure 6:
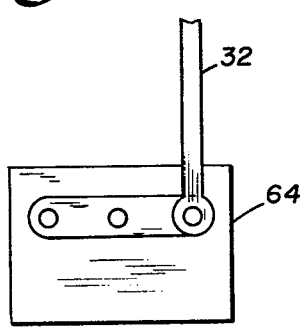
Figure 6:
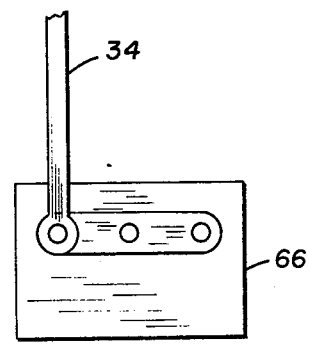

Referring to FIG. 6, the push-pull movement of the cockpit force input control means 32 can be traced through the linkage elements as previously described via bell crank 24 and force transmission means 30 to the T-configured special bell crank-like element 26 to give push-pull movement to force output transmission means 36 and 38. In FIG. 6, mechanical means 64 and 66, such as servo mechanisms, are shown coupled to the cockpit force input control means 32 and 34 for mechanical operation instead of manual operation.

When the cockpit force input control means 32 is held in a fixed position so that the T-configured special bell crank-like element 26 does not pivot about the bolt or pin-type means 60 and such that the crossed "T" portion of the T-configuration is oriented in a transverse position in relation to the airframe, as shown in FIG. 6, the system is set for another mode of movement of the force output transmission means 36 and 38. This positioning of the special bell crank-like element 26 can be noted in FIG. 6 where the crossed "T" portion of the T-configuration is parallel with the configuration of the swing arm 22 which is shown set at right angles with the swing arm mounting element 20. In this position the swing arm 22 and the crossed "T" portion of the T-configuration are in a transverse position to the longitudinal axis of the airframe.

With the crossed "T" portion of the T-configuration of the special bell crank-like element 26 held in the transverse position, as hereinbefore described, when the cockpit input control means 34 is moved in a push-pull direction the swing arm 22 pivots about the bolt or pin-type means 62. In turn, the movement of the swing arm 22 carried the special bell crank-like element 26 with it, but the special bell crank-like element does not pivot around the bolt or pin-type means 60 as previously, because the cockpit input control means 32 is fixed in place and prevents the pivoting action.

In this case the two force output transmission means 36 and 38 move in the same direction concurrently and parallel with each other, either in a push or a pull mode. The parallel and concurrent movement of the force output transmission means 36 and 38 is transferred to the flight control surfaces as shown in FIGS. 3, 4, and 5 and as hereinafter described.

As this invention provides for a mixing or blending of control operations, it can be seen that with concurrent input by both cockpit force input control means 32 and 34 that the force output transmitted to the flight control surfaces, as shown in FIGS. 3, 4, and 5, can be mixed or blended to provide flight control results as a mixture or blending from both bits of force input control means 32 and 34.

Turning now to FIGS. 3, 4, and 5 to discuss the resulting movements of the flight control surfaces of the aircraft. The effect of the operation of cockpit force input control means 32 will be described first, and then the effect of the operation of cockpit force input control means 34. The effect of the operation of both of the cockpit force input control means 32 and 34 concurrently will not be described, but it will be obvious that the movement of the flight control surfaces of the aircraft will be a combination or mixing or blending of the movements.

FIG. 3 shows the application of the flight control mixing system to conventional winged aircraft. Force output transmission means 36 and 38, when operated as hereinbefore described by cockpit force input control means 32, causes the T-configured bell crank-like element 26 to pivot around the bolt or pin-type means 60 (swing arm 22 being held at a right angle with swing arm mounting element 20 by cockpit force input control means 34) when cockpit force input control means 32 is operated in a push-pull mode.

In this case the force output transmission means 36 and 38 operate in opposite directions, as previously described, so that ailerons 40 and 42 tilt or hinge in opposite directions in relation to each other, acting as a roll and lateral control means. Thus, when force output transmission means 36 is in a push mode, force output transmission means 38 is in a pull mode, and vice versa. The resulting action is that aileron 40 will tilt or hinge upward when aileron 42 tilts or hinges downward, or vice versa.

When the cockpit force input control means 32 holds the T-configured special bell crank-like means 26 in a transverse position (in relation to the airframe), as hereinbefore described, and cockpit input force control means 34 is operated in a push-pull mode, the force output transmission means 36 and 38 will operate in a parallel and concurrent push-pull mode. The transverse fixation of the T-configured special bell crank-like element 26 by the cockpit input control means 32 sets the output transmission means 36 and 38 in positions exactly alike so that both of the ailerons 40 and 42 are both aligned with their respective wing surfaces. The operation of cockpit force input means 34 in a push-pull mode, as described hereinbefore, moves the force output transmission means 36 and 38 in a concurrent parallel push or pull mode of movement as directed by the action of the cockpit force input means 34.

In this case the force output transmission means 36 and 38 operate in a manner so that the ailerons 40 and 42 now operate as flaps 40 and 42 for lift control or level control. Thus, the dual use is a mixing or blending of the operations and the ailerons or flaps 40 and 42 may be referred to as flaperons 40 and 42. A mixing of both actions to a degree is available by concurrent mixing or blending movement of both of the cockpit force input control means 32 and 34.

Moving next to FIG. 4, the operation of the cockpit force input control means 32 and 34 and the resulting operational movement of force output transmission means 36 and 38 for the flight control surfaces depicted in FIG. 4 are exactly the same as described hereinbefore for FIG. 3. The resulting action of the movements on the flight control surfaces shown in FIG. 4 is described hereinafter, without reference to the previously described movements and actions of the input control means 32 and 34.

In FIG. 4 the ailerons or elevators 44 and 46 for a tailless or Canard type of aircraft are operated by the push-pull action of the force output transmission means 36 and 38. Because of the dual action of the ailerons or elevators 44 and 46, they may be referred to as elevons.

When the force output transmission means 36 and 38 are operated in the push-pull mode in opposite directions, as hereinbefore described, the elevons 44 and 46 tilt or hinge upward or downward in opposite directions, similar to the aforementioned ailerons. When the force output transmission means 36 and 38 operate in a concurrent parallel mode, both moving in the same push or pull direction, the elevons 44 and 46 both tilt or hinge upward or downward in the same direction, similar to the aforementioned elevators. As previously described, the operations can also be mixed or blended by the system of this invention.

Turning next to FIG. 5, the operation of cockpit force input control means 32 and 34 is the same as hereinbefore described for the conventional winged aircraft in FIG. 3. Likewise, the transmission of the input force and the resulting output force to force movement of output transmission means 36 and 38 is the same as hereinbefore described for the conventional winged aircraft in FIG. 3.

In FIG. 5, the elevator and rudder-like action is a combined action for the V-Tail type of aircraft. For this invention the mixing and blending of the movements of the elevator and rudder-like action may be referred to as ruddervators 48 and 50. Again, like in the previously described operations and movements of FIGS. 3 and 4, the cockpit force input control means 32 and 34, and the force output transmission means 36 and 38, movements and operation are the same. No further description of these internal actions will be provided.

When force output transmission means 36 and 38 operate in a push-pull mode in opposite directions, the ruddervators 48 and 50 tilt or hinge in opposite directions similar to the aileron movement previously described in conjunction with FIG. 3. Likewise, when force output transmission means 36 and 38 operate in a concurrent parallel movement, either push or pull, the ruddervators 48 and 50 operate in the same direction upwardly or downwardly, similar to the elevons movement previously described in conjunction with FIG. 4. Again, with the present invention the several movement attitudes of the ruddervators can be combined as previously described for the other applications.

Thus, the linkage means of the present invention is capable of mixing or blending the various movements and operations of the various flight control surfaces of the several types of aircraft. The present invention is a flight control mixing system to accomplish the aforementioned mixing or blending of the control operations.

The various components of the linkage system described herein may be formed or constructed of various materials such as steel, aluminum, plastics, or other suitable materials to meet the necessary strength for the requirement. The invention is applicable to model aircraft, light aircraft, and heavier aircraft, manually or mechanically operated, as well as radio controlled.

As can be readily understood from the foregoing description of the invention, the present structure can be configured in different modes to provide the ability to mix or blend the flight control movements and operations.

Accordingly, modifications and variations to which the invention is susceptible may be practiced without departing from the scope and intent of the appended claims.

What is claimed is:

1. A motion control mixing system, comprising:
   an object, said object requiring motion control;
   and anchor means, said anchor means being removably affixed to said object;
   a first motion transmission means, said first motion transmission means being removably and pivotally affixed to said anchor means;
   a second motion transmission means, said second motion transmission means being removably and pivotally affixed to said first motion transmission means, said second motion transmission means pivotal affixation being located at the distal extremity of said first motion transmission means;
   a third motion transmission means, said third transmission means being removably and pivotally affixed to said anchor means, said third motion means pivotal affixation being both separate and spaced from said first motion transmission means, said third motion transmission means being of a bell crank configuration, said third transmission means having one leg of said bell crank configuration projecting from said anchor means in substantially the same direction as said first transmission means;
   a fourth motion transmission means, said fourth transmission means having a first end and a second end, said first end being removably and pivotally affixed to said third motion transmission means, said second end being removably and pivotally affixed to said second motion transmission means;
   a first external force means, said first external force means being removably and pivotally affixed to said third motion transmission means, said first external force means being capable of imparting a motion to said third motion transmission means, said first external force means having said pivotal affixation at the distal end of said leg of said bell crank configured third transmission means projecting from said anchor means;
   a second external force means, said second external force means being removably and pivotally affixed to said first motion transmission means, said second external force means being capable of imparting a motion to said first motion transmission means, said second external force means having said pivotal affixation at the distal end of said first motion transmission means;
   a first mechanical power means, said first mechanical power means being suitably and directly connected to said first external force means, said first mechanical power means imparting motion to said first external force means; and
   a second mechanical power means, said second mechanical power means being suitably and directly connected to said second external force means, said second mechanical power means imparting motion to said second external force means.

2. A motion control mixing system as recited in claim 1, wherein said object is an aircraft.

3. A motion control mixing system as recited in claim 2, wherein said motion control mixing system is a flight control mixing system.

4. A motion control mixing system as recited in claim 2, wherein said aircraft has an airframe.

5. A motion control mixing system as recited in claim 4, wherein said anchor means is removably affixed to said airframe.

6. A motion control mixing system as recited in claim 1, wherein said second motion transmission means has a T-like configuration, said pivotally affixation to said first motion transmission means being at the juncture of the cross member and vertical leg of said "T".

7. A motion control mixing system as recited in claim 1, wherein said second external force means is capable of holding said first motion transmission means in a fixed position while said first external force means imparts push and pull motions to said third transmission means, said imparted push and pull motions concurrently imparting push and pull motions to said fourth motion transmission means, said second end of said fourth motion transmission means being pivotally affixed to said distal end of said vertical leg of said "T" of said second motion transmission means, said fourth motion transmission means thereby concurrently imparting said push and pull motions to said second motion transmission means causing said second motion transmission means to pivot about its said pivotally affixation to said first motion transmission means, said push and pull motions thereby being transmitted to a point of said object requiring said motion control.

8. A motion control mixing system as recited in claim 7, wherein said object is an aircraft and said motion control mixing system is a flight control mixing system.

9. A motion control mixing system as recited in claim 8, wherein said point of said object requiring said motion control are the flaperons of said aircraft, said flaperons serving the function of ailerons, said aircraft being a conventional winged type.

10. A motion control mixing system as recited in claim 8, wherein said point of said object requiring said motion control are the elevons of said aircraft, said elevons serving the function of ailerons, said aircraft being a tailless or Canard type.

11. A motion control mixing system as recited in claim 8, wherein said point of said object requiring said motion control are the ruddervators of said aircraft, said ruddervators serving the function of rudder-like control, said aircraft being a V-tail type.

12. A motion control mixing system as recited in claim 1, wherein said first external force means is capable of holding said third motion transmission means in a fixed position while said second external force means imparts push and pull motions to said first motion transmission means, said imparted push and pull motions concurrently imparting push and pull motions to said second motion transmission means, said fixed position of said third motion transmission means thereby preventing said fourth motion transmission means from imparting any push or pull motion to said second motion transmission means while maintaining a constant fixed orientation of said second motion transmission means in relation to the orientation of said object, said second motion transmission means moving in a concurrent parallel direction to the direction of the push and pull motions imparted by said second external force means, said push and pull motions of said second motion transmission means being transmitted to a point of said object requiring said motion control.

13. A motion control mixing system as recited in claim 12, wherein said object is an aircraft and said motion control mixing system is a flight control mixing system.

14. A motion control mixing system as recited in claim 13, wherein said point of said object requiring said motion control are the flaperons of said aircraft, said flaperons serving the function of flaps, said aircraft being a conventional winged type.

15. A motion control mixing system as recited in claim 13, wherein said point of said motion control are the elevons of said aircraft, said elevons serving the function of elevators, said aircraft being a tailless or Canard type.

16. A motion control mixing system as recited in claim 13, wherein said point of said motion control are the ruddervators of said aircraft, said ruddervators serving the function of elevators, said aircraft being a V-tail type.

17. A motion control mixing system as recited in claim 1, wherein said first and second external force means impart concurrent motion to said third and first motion transmission means, respectively, thereby causing a concurrent mixture of motions to said second motion transmission means, said concurrent mixture of motions being transmitted to a point of said object requiring said motion control.

18. A motion control mixing system as recited in claim 17, wherein said object is an aircraft and said motion control mixing system is a flight control mixing system.

19. A motion control mixing system as recited in claim 18, wherein said point of said object requiring said motion control are the flaperons of said aircraft, said flaperons serving the mixed function of both ailerons and flaps, said aircraft being a conventional winged type.

20. A motion control mixing system as recited in claim 18, wherein said point of said motion control are the elevons of said aircraft, said elevons serving the mixed function of both ailerons and elevators, said aircraft being a tailless or Canard type.

21. A motion control mixing system as recited in claim 18, wherein said point of control of said motion control are the ruddervators of said aircraft, said ruddervators serving the mixed function of both rudder-like control and elevators, said aircraft being a V-tail type.

22. A motion control mixing system as recited in claim 1, wherein the object is a model airplane.

23. A motion control mixing system as recited in claim 1, wherein the object is radio controlled.

24. A motion control mixing system as recited in claim 1, wherein said anchor means consists of a rectangular prism member, a first protrusion means, and a second protrusion means, said rectangular prism member having a front surface and a top surface, said first protrusion means being suitably affixed to said front surface, said second protrusion means being suitably and partially affixed to said top surface and to said front surface, said first motion transmission means having said pivotal affixation made to said first protrusion means, and said third motion transmission means having said pivotal affixation made to said second protrusion means.

* * * * *